United States Patent [19]
Metzger

[11] Patent Number: 4,606,556
[45] Date of Patent: Aug. 19, 1986

[54] WEAR RESISTANT ELBOW

[75] Inventor: Robert E. Metzger, Allentown, Pa.

[73] Assignee: Fuller Company, Bethlehem, Pa.

[21] Appl. No.: 737,747

[22] Filed: May 28, 1985

[51] Int. Cl.[4] ............................................. F16L 55/00
[52] U.S. Cl. ....................................... 285/16; 285/179
[58] Field of Search ..................... 285/179, 127, 16, 17

[56] References Cited

U.S. PATENT DOCUMENTS

| | | | |
|---|---|---|---|
| 898,882 | 9/1908 | Hawkins | 285/16 |
| 1,044,181 | 11/1912 | Hudson | 285/16 X |
| 1,064,343 | 6/1913 | Kennedy | 285/179 X |
| 1,357,259 | 11/1920 | Strong | 285/16 |
| 1,960,412 | 5/1934 | Domina | 285/179 X |
| 4,130,300 | 12/1978 | Sheridan | 285/16 |
| 4,251,170 | 2/1981 | Sheridan | 285/16 |
| 4,479,743 | 10/1984 | Stahl | 285/16 X |

FOREIGN PATENT DOCUMENTS

| | | | |
|---|---|---|---|
| 166495 | 3/1905 | Fed. Rep. of Germany | 285/16 |
| 508963 | 10/1930 | Fed. Rep. of Germany | 285/16 |
| 662595 | 8/1929 | France | 285/16 |
| 1067354 | 6/1954 | France | 285/16 |
| 2521256 | 8/1983 | France | 285/179 |

Primary Examiner—Thomas F. Callaghan
Attorney, Agent, or Firm—Frank H. Thomson

[57] ABSTRACT

A wear resistant pipe elbow for use in transporting fluent materials such as in a pneumatic conveying system. The elbow includes a wear back or wear resistant surface on the inside of the outer wall of an arcuate channel connecting an inlet leg with an exit leg of the elbow. The wear resistant surface may include a plurality of steps which extend symmetrically toward the inlet leg and the outlet leg. The center of the steps is preferably located on a radius extending from the center of curvature of the arcuate channel through the junction of the longitudinal axis of the inlet leg and the longitudinal axis of the outlet leg. The wear back or wear resistant surface may be made up of a member including a plurality of ribs which defined spaced apart pockets. These pockets are designed to receive and at least partially retain material being conveyed through the system. While the ribs or steps in the wear resistant backing will wear, the depth of metal in this area will prolong the life of the elbow.

4 Claims, 8 Drawing Figures

U.S. Patent   Aug. 19, 1986   Sheet 1 of 2   4,606,556
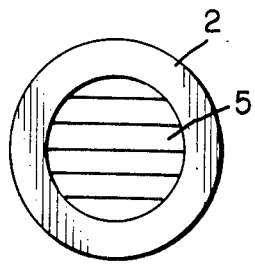
FIG. 2
PRIOR ART
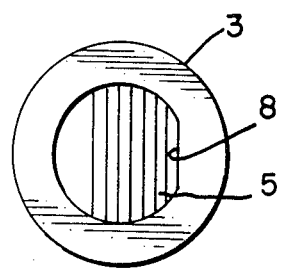
FIG. 3
PRIOR ART
FIG. 6
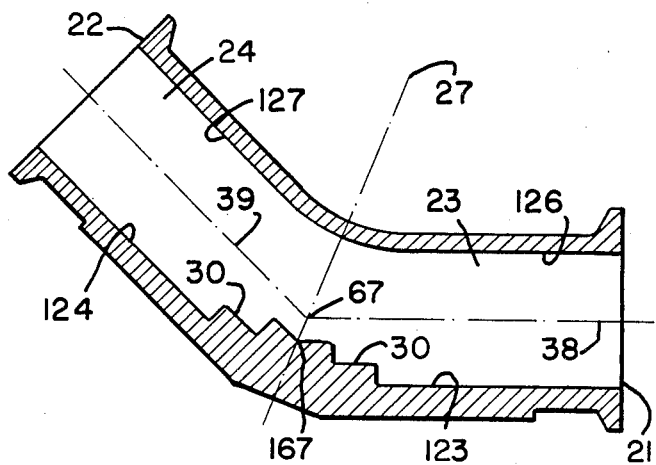
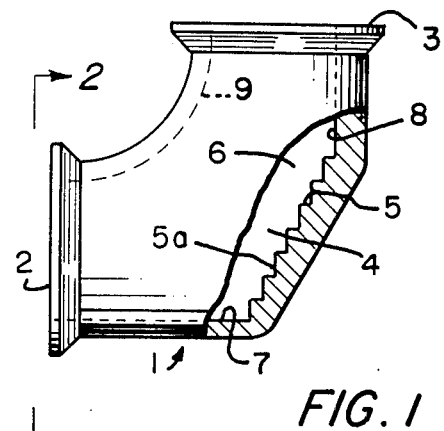
FIG. 1
PRIOR ART
FIG. 4
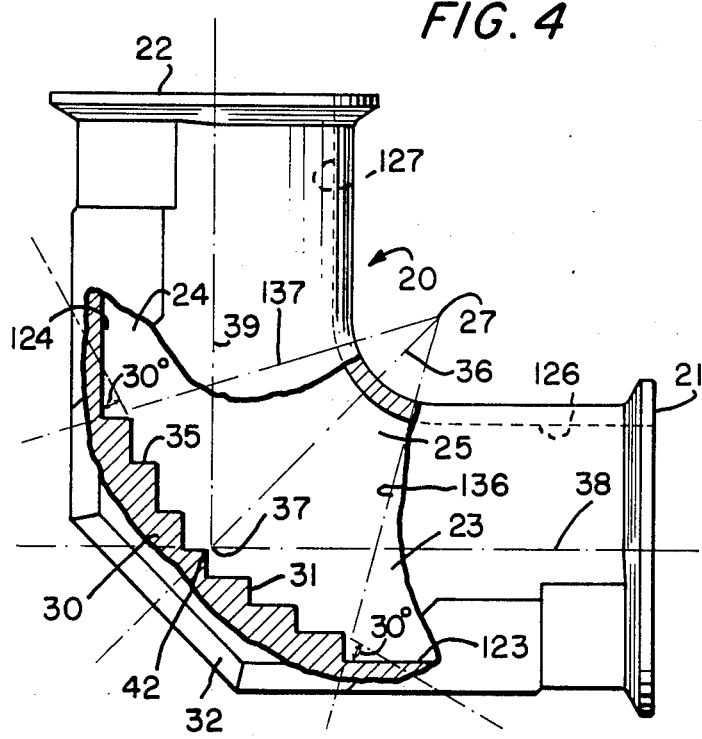
FIG. 5
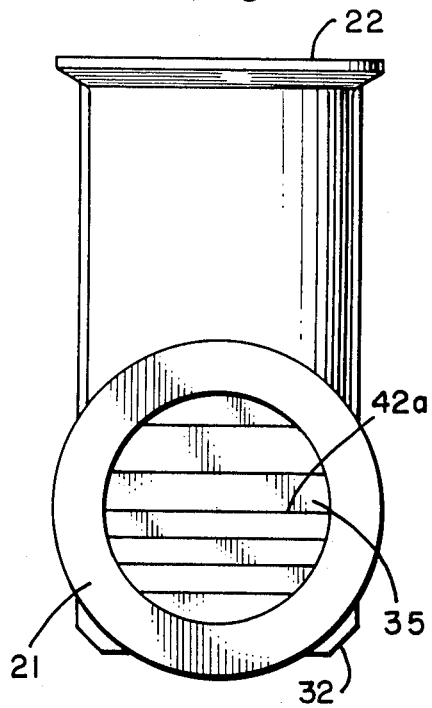

WEAR RESISTANT ELBOW

BACKGROUND OF THE INVENTION

This invention relates to elbows for use in systems for transporting fluent materials and in particular to a short radius elbow for use in a system for pneumatically conveying solid particulate material such as fly ash, cement and similar abrasive materials.

Prior to the present invention, it was common practice to utilize long radius turns in pneumatic conveying systems. It was believed that these long radius turns reduced wear on the conveying pipeline as well as minimizing pressure drop. It was also known prior to the present invention to utilize short radius turns or elbows insystems for conveying fluent materials and employ a thickened or stepped wear resistant surface on the inside of the elbow to prolong the life of the elbow. With prior designs, the impact steps are located primarily in the outlet leg only. With this type of wear resistant elbow, the material often impacts the stepped wear resistant portion and is re-entrained by high level fluid energy in the downstream leg of unprotected portions of the following conveying pipe.

It has been discovered by the present invention that by placing the wear resistant steps symmetrically toward both the inlet leg and the outlet leg, an improved wear resistant elbow is achieved in that the primary impact of the abrasive material being conveyed is absorbed by the wear resistant section of the elbow, that there is early rebound of material back to the turning air stream and less material build up in the area upstream. This early rebound of material means that the wear caused by material being turned is absorbed by the protected portion of elbow and less in the following pipe as in the prior art.

SUMMARY

It it the principal object of this invention to provide a wear resistant elbow for use in conjunction with transport systems for fluent materials with improved wear resistant characteristics such that the wear is on the reinforced surface and not elsewhere.

It is another principal object of this invention to provide a wear resistant elbow which has the ability to be used in either direction of material flow and is capable of being reversed after a period of operation to achieve extended life.

In general, the invention is carried out by providing a wear resistant pipe elbow for use in transporting fluent materials comprising an inlet leg and an outlet leg, an arcuate channel connecting the inlet leg and the outlet leg, a wear resistant surface on the inside of the outer wall of the arcuate channel including a plurality of steps extending symmetrically toward the inlet leg and the outlet leg.

With the design of the present invention, the wear resistant member extends symmetrically from a position which is located on a radius extending from the center of curvature of an arc connecting the inlet leg with the outlet leg and extending through the junction of the longitudinal axis of the inlet leg and the longitudinal axis of the outlet leg. This is approximately the midpoint of the arc connecting the inlet and the outlet. With a 90° elbow, this position is substantially on the junction of the two axes. With a larger degree elbow, the point is located outside of that junction to ensure an opening through the elbow which is sufficiently large to prevent flow restriction.

Also with the present invention, a wear back or wear resistant surface can be formed by a plurality of spaced apart ribs which define pockets or cavities for material being conveyed.

BRIEF DESCRIPTION OF THE DRAWINGS

The invention will be described in connection with the annexed drawings wherein:

FIG. 1 is a elevation view with parts in section of an elbow according to the prior art;

FIG. 2 is a view taken on the line 2—2 of FIG. 1 showing the prior art;

FIG. 3 is a top view of the elbow of FIG. 1;

FIG. 4 is an elevation view with parts in section of an elbow according to the present invention;

FIG. 5 is an end view of the elbow according to FIG. 4;

FIG. 6 is a sectional view of a further elbow according to the present invention;

DESCRIPTION OF THE PREFERRED EMBODIMENTS

Figure 7:
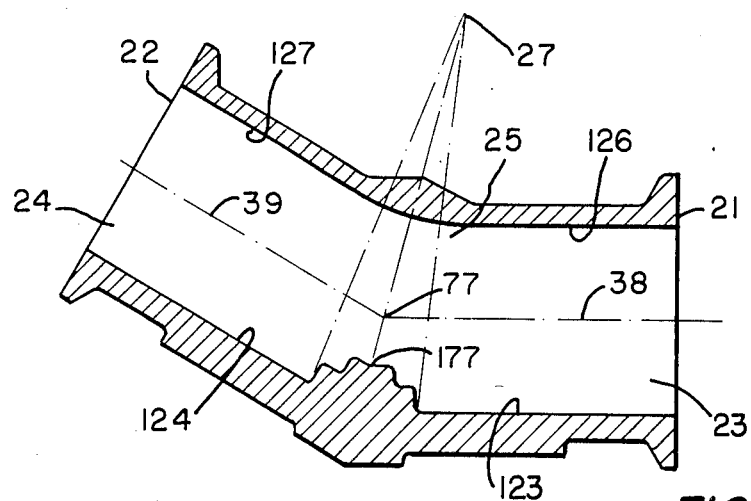
FIG. 7 is a sectional view of an additional elbow according to the present invention.

The prior art is shown in FIGS. 1 to 3 and includes an elbow generally indicated at 1 for use in transporting fluent materials in general and specifically conveying solid particulate material in a pneumatic conveying system. The elbow includes an inlet port 2 and an outlet port 3 with a channel 4 connecting the inlet 2 with the outlet 3. The channel includes on its inside a stepped wear resistant surface 5. As shown in FIG. 2, the steps 5 are flat across the width of the elbow. As can be seen clearly from FIG. 1, this stepped surface 5 is primarily in the outlet leg 6 of the elbow 1. The inlet leg 7 is substantially unprotected.

It has been found that with the design of the prior art, as material flows from inlet 2 to outlet 3, material will impact the front 5a of the stepped surface and there will be a heavy material build-up upstream of the stepped surface 5 in the area of the inlet leg 7. In addition, it has been found that there will be an impact of material downstream of the stepped area 5 along the wall in the area indicated at 8. Further, it has been found that with the prior art, as material flows through the elbow, it will strike the front 5a of stepped surface 5 and rebound to be directed across the elbow 1 and impact the unprotected area 9, or even downstream of the elbow in the conveying pipe connected to the elbow. When a highly abrasive material is being carried at high velocities, this can cause excessive wear in the area 9.

It will also be seen from viewing FIG. 3 that with the design of the prior art, the outlet 3 is not circular in configuration as the area 8 will flatten the outlet opening. This creates a smaller opening and can result in back pressure in the conveying system.

According to the present invention as illustrated in FIGS. 4 to 8, it has been found that the stepped surface should be symmetrical with the inlet leg and the outlet leg.

Referring to FIG. 4, there is shown a 90° elbow 20 according to the present invention. This elbow includes a pair of ports 21 and 22, either of which may serve as the inlet or the outlet. This is contrary to the prior art which is essentially only suitable for use in conveying material in one direction. These ports 21 and 22 communicate with a leg 23 which for the purposes of explanation will be considered the inlet leg and a leg 24 which for the purposes of explanation will be considered an outlet leg. The legs 23 and 24 are connected by an arcuate channel 25. It is to be understood that the leg 24 may serve as the inlet and leg 23 may serve as the outlet depending upon the orientation of the elbow. The arcuate channel 25 has a center of curvature at 27.

According to the present invention a wear resistant and heavy mass 30 is positioned on the inside wall 31 of the outer wall 32 of the arcuate channel 25. This wear resistant surface includes a plurality of flat steps 35 which extend across the width of the elbow; see FIG. 5. The steps also extend symmetrically towards each leg 23 and 24 or towards the inlet and the outlet leg at equal angles. These steps extend symmetrically from a position which is located on a radius 36 which extends from the center of curvature 27 of the arcuate channel 25 through the junction 37 of the longitudinal axis 38 of the leg 23 or opening 21 and the longitudinal axis 39 of the leg 24 or opening 22.

With the embodiment shown in FIG. 4, the point or position from which the steps 35 extend is designated at 42 and this point is located outside the junction 37. With the embodiment of FIG. 4, the angle between the leg 23 and the steps 35 and the angle between the leg 24 and the steps 35 is 30°.

The location of the point from which the steps radiate will vary with the angle of the elbow, but must be on the radius extending through the junction of the two elbow legs. For example, in FIGS. 6 and 7 where an elbow of greater than 90° is illustrated, the steps extended symmetrically from a point which is substantially outside the junction of the longitudinal axis 38 of the leg 23 with the longitudinal axis 39 of the leg 24 as shown at 67 in FIG. 6 and 77 in FIG. 7. If this point coincided with the junction, the material conveying channel 25 would be too narrow to properly convey material. It is, however, desirable to locate the point of symmetry of the steps as close to that junction as feasible. It should also be noted that in FIGS. 6 and 7 the point from which the steps originate may be a recess as at 167 or 177 respectively rather than from the leading edge of the step at 42a in FIGS. 4 and 5.

With the stepped design of the present invention, it has been found that there is substantially less material impact in the areas both upstream of the stepped configuration and downstream of the stepped configuration. Thus, unlike the prior art of FIGS. 1 to 3 where there is a material build-up in area 7 on the inlet side of the elbow, and material impact in the areas 8 and 9 on the outlet side, with the present invention, the material build-up in the areas 123 and 124 upstream and downstream of the wear resistant area 30 is substantially reduced. In addition, material rebound or impact on the area across from the steps in the area 126 and 127 is substantially reduced. This is particularly true when material is being conveyed in the vertical direction, i.e. from opening 21 to opening 22.

Figure 8:
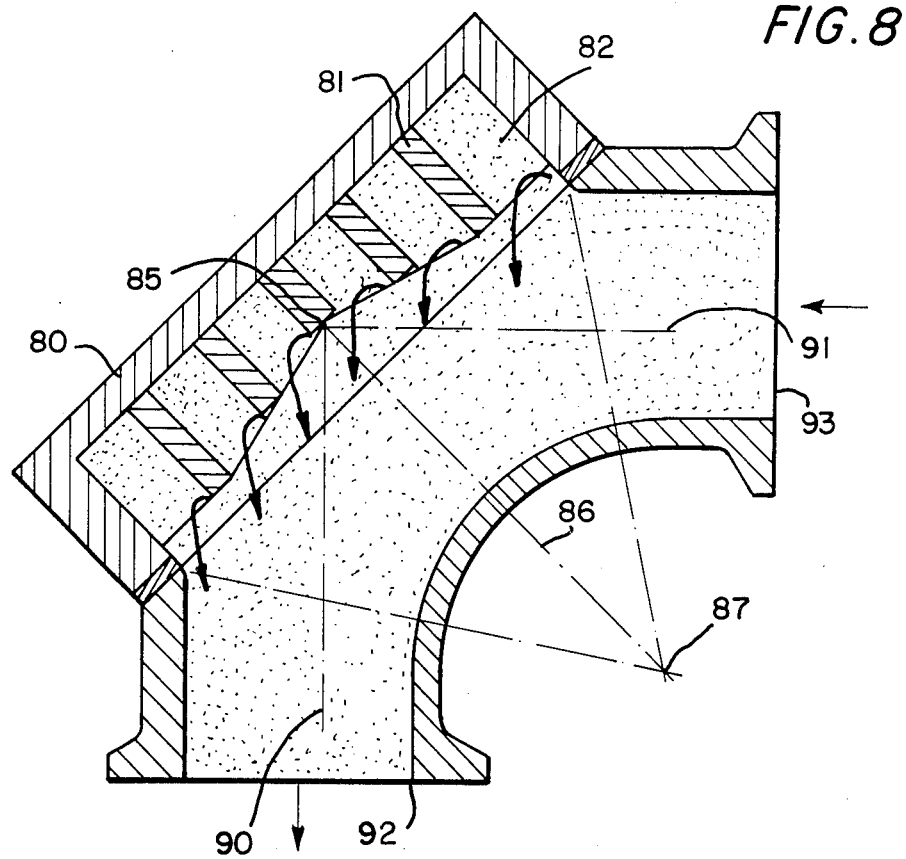
FIG. 8 is a sectional view of a modified form of the present invention.

The invention also contemplates a wearback as shown in FIG. 8. In this design, the stepped configuration of FIGS. 4 to 7 is replaced by a cast wearback indicated at 80 which may be formed from a casting separate from the inlet and outlet legs and includes a plurality of ribs 81 which define cavities or pockets 82 therebetween. These cavities serve to receive material being conveyed through the elbow and at least partially retain material within the elbow. This is particularly true if the elbow is inverted from that shown in FIG. 8. With the design shown in FIG. 8, the wearback 80 may be replaced if that portion wears before the balance of the element. As is the case with FIGS. 4 to 7, the step or ribs 81 radiate from a central position 85 which is on the radius 86 extending from the center of curvature 87 extending through the junction of the longitudinal axes 90 and 91 of leg 92 and 93, respectively. The symetrical nature of the ribs 81 is shown by the increasing depth of the ribs and resultant pockets.

A primary function of the adaptation of FIG. 8 is to retain the integrity of the stepped relationship as the metal is abraded, permit material being conveyed to wear on material being conveyed (i.e., trapped in the pockets) and thereby lengthen life and maintain a constant flow pattern over the life of the elbow.

With the present invention, a symmetrical wear resistant elbow has been provided which can be reversed to prolong wearlife as well as eliminate the necessity of having multiple design elbows. The elbow can be utilized in conveying material in either a horizontal direction or a vertical direction or angle therebetween. While the cavity design as illustrated in FIG. 8 will retain little material during shutdown, during the conveying process, material will fill up the cavities to improve wear life.

From the foregoing it should be apparent that the object of the present invention has been carried out. It is intended, however, that the invention be limited solely by that which is in the scope of the appended claims.

I claim:

1. A wear resistant pipe elbow for use in transporting fluent material comprising an inlet leg and an outlet leg, an arcuate channel connecting the inlet leg and the outlet leg, and a wear resistant surface on the inside of the outer wall of the arcuate channel including a plurality of steps extending symmetrically toward the inlet leg and the outlet leg from a position located on a radius extending from the center of curvature of the arcuate channel through the junction of the longitudinal axis of the inlet leg and the longitudinal axis of the outlet leg and outside the junction of the longitudinal axis of the inlet leg and the longitudinal axis of the outlet leg.

2. A wear resistant pipe elbow according to claim 1 wherein said inlet leg and said outlet leg are cylindrical.

3. A wear resistant pipe elbow according to claim 1 wherein said elbow is a 90° elbow and said steps extend at equal angles toward said inlet leg and said outlet leg.

4. A wear resistant pipe elbow according to claim 1 wherein said steps include a plurality of spaced apart ribs which define a plurality of cavities.

* * * * *